(12) United States Patent
Yasuda

(10) Patent No.: US 6,590,613 B2
(45) Date of Patent: Jul. 8, 2003

(54) AUTOMATIC FOCUS ADJUSTING DEVICE USING LUMINANCE AND ILLUMINANCE DETECTION

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/738,011

(22) Filed: Dec. 15, 2000

(65) Prior Publication Data

US 2001/0000674 A1 May 3, 2001

Related U.S. Application Data

(62) Division of application No. 08/617,049, filed on Mar. 18, 1996, now Pat. No. 6,163,340.

(30) Foreign Application Priority Data

Mar. 27, 1995 (JP) .............................................. 7-068361
Mar. 27, 1995 (JP) .............................................. 7-068366

(51) Int. Cl.$^7$ .............................................. G03B 13/00
(52) U.S. Cl. ...................................... 348/349; 348/351
(58) Field of Search ................................ 348/345, 348, 348/349, 351, 353, 354, 355, 356, 255, 207, 350, 366, 370, 371, 207.99; 396/80, 81, 82, 101, 106, 125

(56) References Cited

U.S. PATENT DOCUMENTS

| | | | | | |
|---|---|---|---|---|---|
| 4,853,788 | A | * | 8/1989 | Murashima et al. | 348/355 |
| 5,005,086 | A | * | 4/1991 | Iwamoto et al. | 348/356 |
| 5,212,516 | A | * | 5/1993 | Yamada et al. | 348/354 |
| 5,337,084 | A | * | 8/1994 | Nakamura | 348/345 |
| 6,163,340 | A | * | 12/2000 | Yasuda | 348/345 |
| 6,222,588 | B1 | * | 4/2001 | Yamazaki et al. | 348/355 |

* cited by examiner

Primary Examiner—Aung S. Moe
(74) Attorney, Agent, or Firm—Robin, Blecker & Daley

(57) ABSTRACT

An automatic focus adjusting device is provided with a focus evaluation value detecting circuit for detecting a focus evaluation value indicative of a focusing state of a lens, a focus control part for performing a focus adjusting operation by causing the lens to move in an optical axis direction whereby the focus evaluation value becomes a maximum value, a luminance detecting circuit for detecting luminance of an object or an illuminance detecting circuit for detecting an illuminance to an object, and a control circuit for lowering a response characteristic of the focus adjusting operation according to the luminance or illuminance detected by the luminance or illuminance detecting circuit.

5 Claims, 17 Drawing Sheets

AUTOMATIC FOCUS ADJUSTING DEVICE USING LUMINANCE AND ILLUMINANCE DETECTION

CROSS-REFERENCE TO RELATED APPLICATIONS

This application is a divisional of application Ser. No. 08/617,049, filed Mar. 18, 1996, now U.S. Pat. No. 6,163,300.

BACKGROUND OF THE INVENTION

1. Field of the Invention

This invention relates to an automatic focus adjusting device adapted for use in a video camera or the like.

2. Description of the Related Art

The advancement of video apparatuses such as video cameras, etc., has been conspicuous during recent years. The video apparatuses are now generally arranged to have versatile functions including automatic focus control, automatic iris control and zooming functions, etc., and also to have improved operability in every function.

With regard to automatic focus adjusting devices for performing the automatic focus control, a method of adjusting focus by detecting the sharpness of a picture from a video signal obtained by photo-electrically converting an object image at an image sensor and then by controlling the position of a focusing lens in such a way as to make the sharpness of the picture maximum has been becoming a main stream.

To evaluate the sharpness of the picture, use is generally made of the level of a high-frequency component of the video signal extracted through a band-pass filter of a certain frequency band, i.e., a focus voltage. In shooting an ordinary object, the level of the high-frequency component (focus voltage) increases accordingly as the state of focus becomes sharper. Thus, an in-focus state is considered to be attained at a point where that level reaches a maximum level.

However, the conventional automatic focus adjusting device has prevented the following problem. In moving a focusing lens by a predetermined amount of movement at a time, when the direction of moving the focusing lens is inverted, a play between a rack and a shaft which are arranged to drive the focusing lens sometimes tends to prevent the focusing lens from being moved by an amount of movement proportional to the amount of rotation of a motor, as shown by a line "c" in FIG. 8, even if the motor is rotated by a certain amount. As a result, there arises an error in the position of the focusing lens. The adverse effect on the focus caused by the error of the position of the focusing lens is greatly increasing as the image pickup plane of the image sensor (CCD) is becoming smaller these days. The above-mentioned play makes it hardly possible to secure an accurate amount of movement of the focusing lens, so that a precise AF (automatic focusing) evaluation value can not be obtained. The inaccurate evaluation value then might result in misjudgment about the direction in which to move the focusing lens.

SUMMARY OF THE INVENTION

This invention is directed to the solution of the problem of the prior art mentioned above. It is, therefore, a general object of this invention to provide a highly reliable automatic focus adjusting device which is capable of operating with a high degree of precision.

It is a more specific object of this invention to provide an automatic focus adjusting device arranged to be capable of accurately attaining an in-focus state irrespective of any play in a lens driving mechanism.

To attain these objects, an automatic focus adjusting device arranged according to this invention as a preferred embodiment thereof comprises AF evaluation value detecting means for detecting an AF evaluation value indicative of a focusing state of a lens, lens driving means for moving the lens in an optical axis direction, control means for controlling the lens driving means on the basis of the AF evaluation value detected by the AF evaluation value detecting means in such a way as to cause the lens to move back and forth by a predetermined amount of movement at a time until the AF evaluation value becomes a maximum value, inversion detecting means for detecting inversion of a direction of movement of the lens, and altering means for altering the predetermined amount of movement of the lens in response to detection of the inversion by the inversion detecting means.

An automatic focus adjusting device arranged as another preferred embodiment of this invention comprises, in addition to the components of the embodiment described above, focal length detecting means for detecting a focal length of the lens, and inhibiting means for inhibiting the altering means from altering the predetermined amount of movement, according to the focal length detected by the focal length detecting means.

The above and other objects and features of this invention will become apparent from the following detailed description of embodiments thereof taken in conjunction with the accompanying drawings.

DETAILED DESCRIPTION OF THE PREFERRED EMBODIMENTS

The following describes the automatic focus adjusting device of this invention through preferred embodiments of this invention referring to the accompanying drawings.

Figure 1:
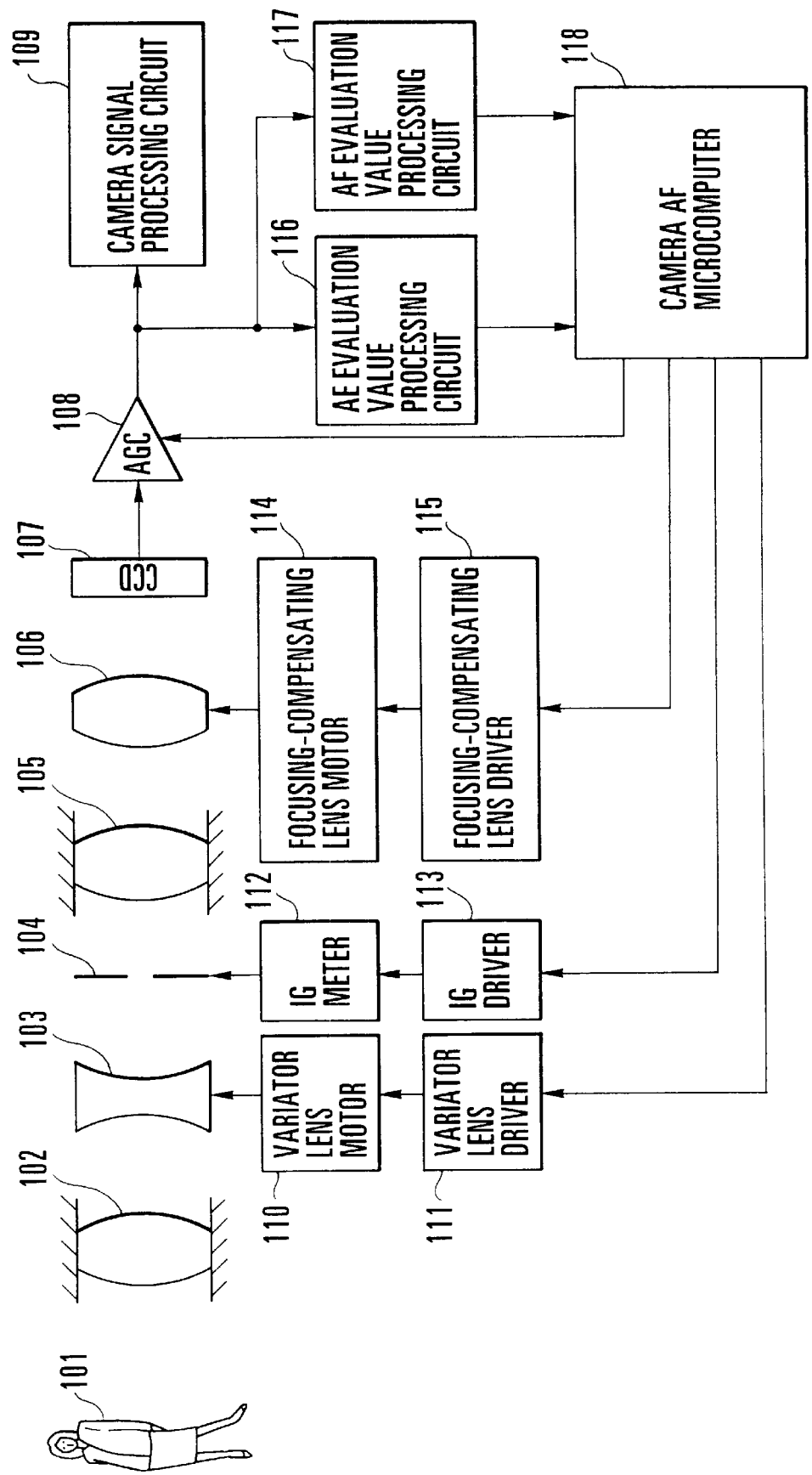
FIG. 1 is a block diagram showing the arrangement of a video camera to which this invention is applicable.

FIG. 1 is a block diagram showing the fundamental arrangement of a video camera to which this invention is applicable.

Referring to FIG. 1, an object to be shot by the video camera is denoted by reference numeral 101. The video camera includes a first fixed lens group 102, a variator lens 103, an iris 104, a second fixed lens group 105, a focusing-compensating lens (hereinafter referred to as focusing lens) 106 which is arranged to perform a function of compensating for movement of a focal plane caused by changes taking place in magnifying power as well as a function of making focus adjustment, a CCD 107 which is employed as an image sensor, an AGC circuit 108 which is arranged to amplify the output of the CCD 107 and whose amplifying rate is controlled by a signal from a camera AF microcomputer 118, a camera signal processing circuit 109, actuators 110, 112 and 114 which are respectively arranged to move the variator lens 103, the iris 104 and the focusing lens 106, drivers 111, 113 and 115 which are respectively arranged to drive the actuators 110, 112 and 114 according to signals from the camera AF microcomputer 118, an AE evaluation value processing circuit 116 which is arranged to obtain an integrated value of a video signal level to be used for control over the iris 104 and the AGC circuit 108 by using the level of a signal outputted from the CCD 107, an AF evaluation value processing circuit 117 which is arranged to extract, from the signal outputted from the image sensor (CCD) 107, a high-frequency component to be used in detecting focus, and the camera AF (automatic focusing) microcomputer 118 which is arranged to control the whole system of the video camera and to control the actuators 110, 112 and 114 and the AGC circuit 108 on the basis of signals outputted from the AE evaluation value processing circuit 116 and the AF evaluation value processing circuit 117.

With the video camera configured as described above, the camera AF microcomputer 118 performs automatic exposure adjustment by controlling the opening and closing actions on the iris 104 and the amplifying rate of the AGC circuit 108 in such a way as to make the level of a signal outputted from the AE evaluation value processing circuit 116 constant. Further, the camera AF microcomputer 118 performs automatic focus adjustment by causing the focusing lens 106 to move along an optical axis in such a way as to bring the level of a signal outputted from the AF evaluation value processing circuit 117 to a maximum level.

Control operations of the camera AF microcomputer 118 are next described with reference to FIGS. 2 to 5 which are flow charts.

Figure 2:
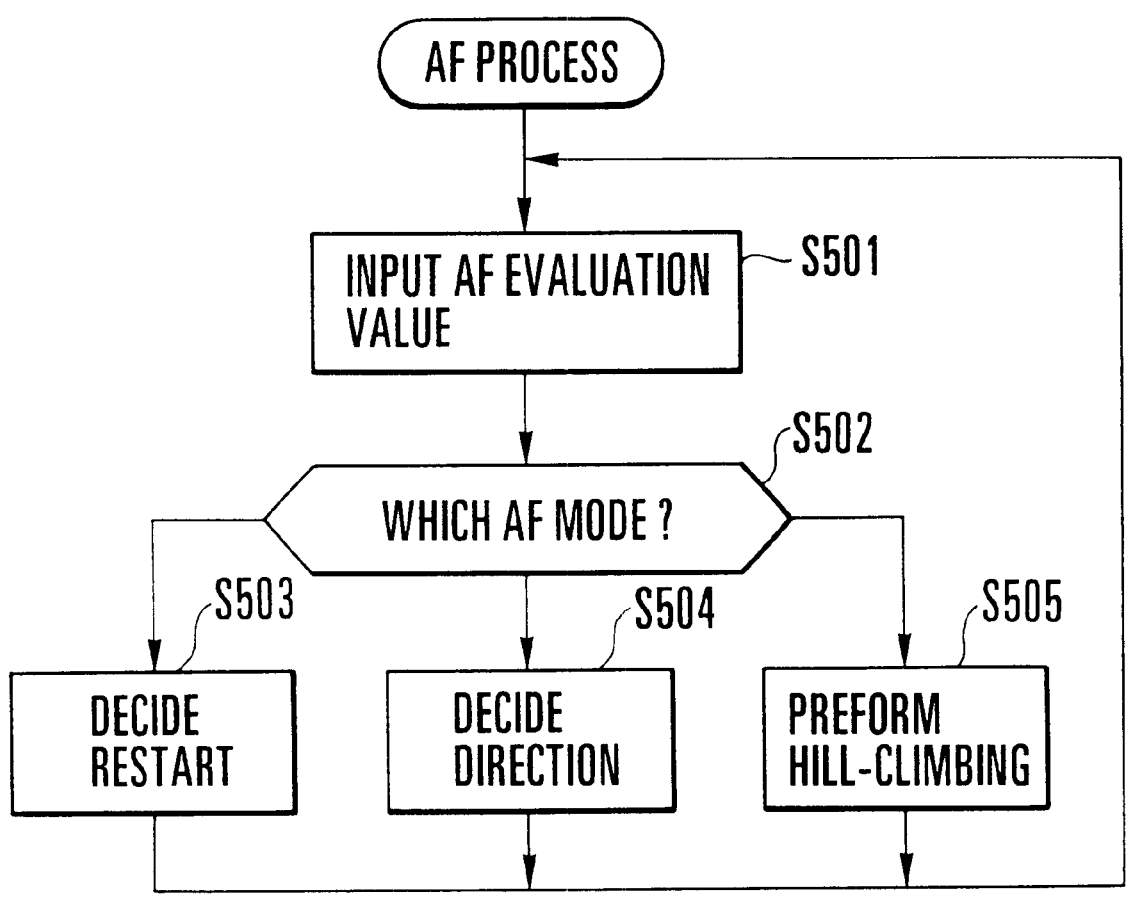
FIG. 2 is a flow chart showing an AF mode discriminating operation.

An AF control process is first described from an overall point of view referring to FIG. 2 as follows. At a step S501, an AF evaluation value is taken in from the AF evaluation value processing circuit 117. At a step S502, a check is made for the current AF mode. If the current AF mode is found to be a restart deciding mode, the flow of operation comes to a step S503 to perform a restart deciding process. If the current AF mode is found to be a direction deciding mode, the flow comes a step S504 to perform a direction deciding process. If the current AF mode is found to be a hill-climbing mode, the flow comes to a step S505 to perform a hill-climbing process. The content of each process of the steps S503, S504 and S505 will be explained below.

Figure 3:
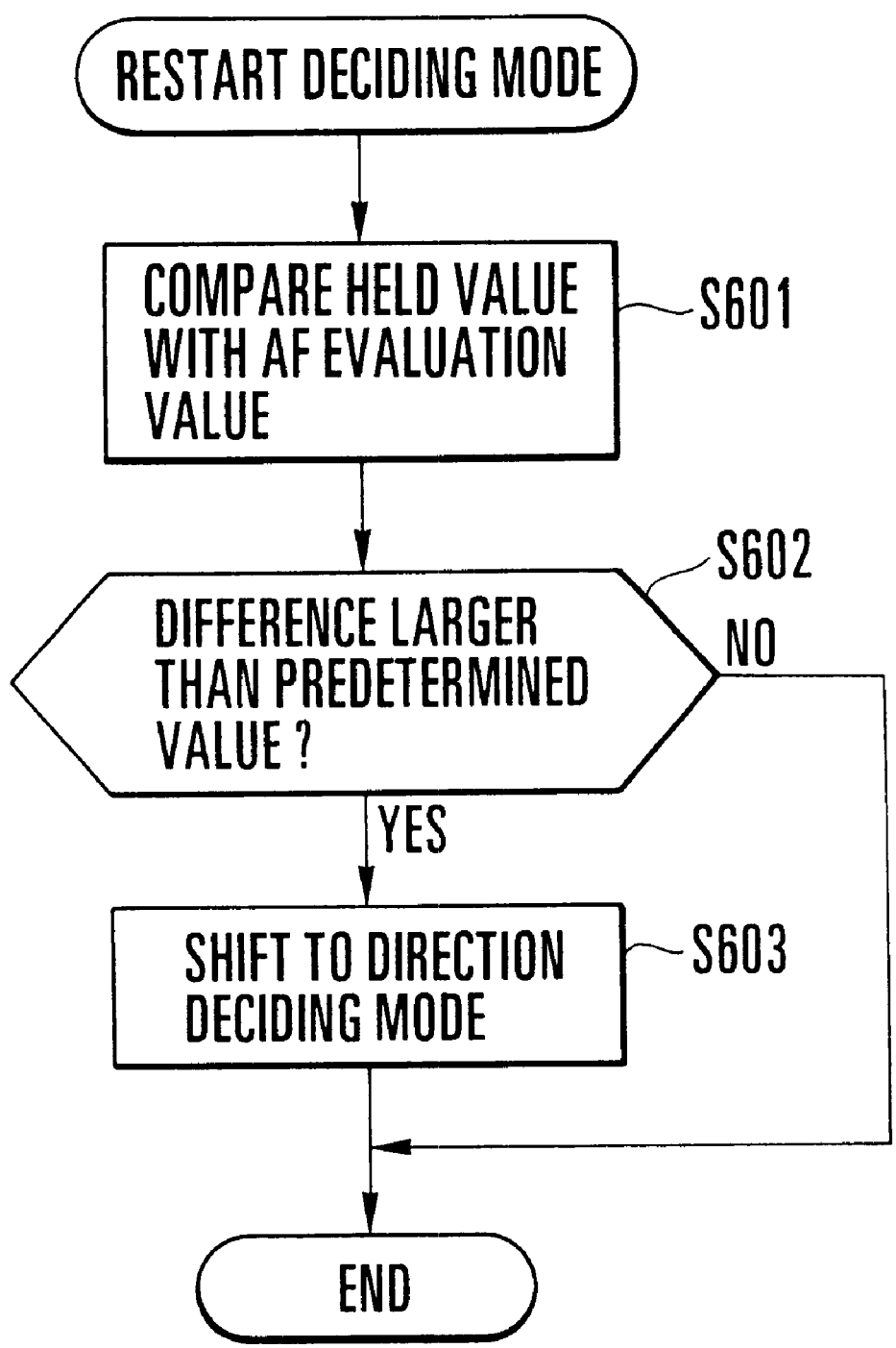
FIG. 3 is a flow chart showing an operation of deciding a restart.

FIG. 3 shows processes to be performed in the restart deciding mode. At a step S601, the AF evaluation value is compared with a held value, which has been held when the flow of operation has shifted to the restart deciding mode at a step S705 of FIG. 4, which will be described later. If a difference between the held value and the AF evaluation value is found at a step S602 to be larger than a predetermined value, the flow comes to a step S603 to shift to the direction deciding mode before the flow comes to an end. If the difference between the held value and the AF evaluation value is not larger than the predetermined value, the flow directly comes to an end.

Figure 4:
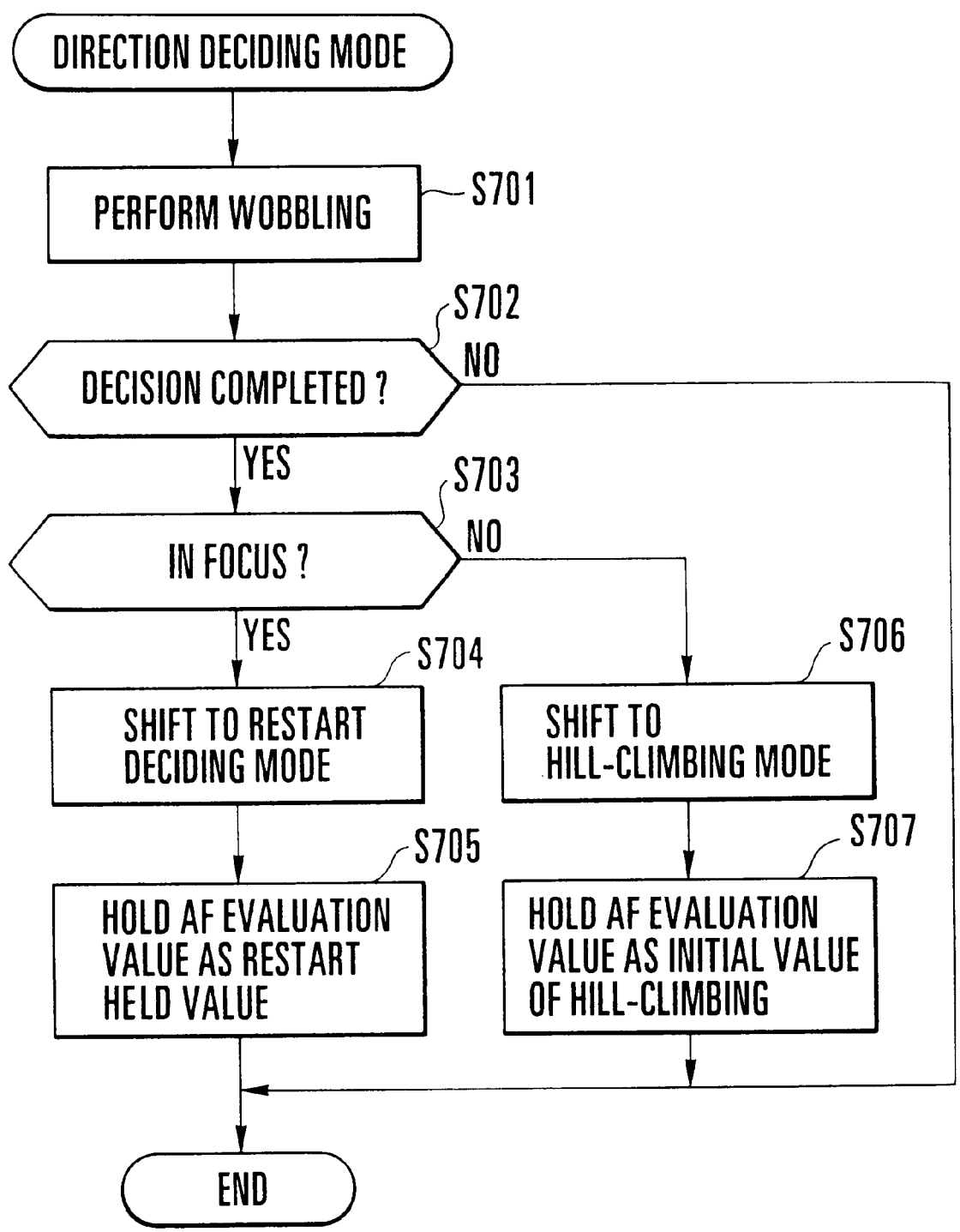
FIG. 4 is a flow chart showing an operation of deciding a direction.

FIG. 4 shows processes to be performed in the direction deciding mode. At a step S701, a process of wobbling by which the focusing lens 106 is vibrated back and forth is executed to decide if an in-focus state is attained and, if not, to decide a direction of movement of the focusing lens 106 for attaining an in-focus state. At a step S702, a check is made to find if the decision has been completed. If not, the flow comes to an end. If so, the flow comes to a step S703. At the step S703, a check is made to find if an in-focus state is attained. If so, the flow comes to a step S704 to shift to the restart deciding mode. At the next step S705, an AF evaluation value currently obtained is held as a restart held value, and the flow comes to an end. If the focusing lens 106 is found not in an in-focus state by the step S703, the flow comes to a step S706 to shift to the hill-climbing mode. At the next step S707, an AF evaluation value currently obtained is held as an initial value of hill-climbing, and then a hill-climbing process is executed in the direction decided by the step S701.

Figure 6:
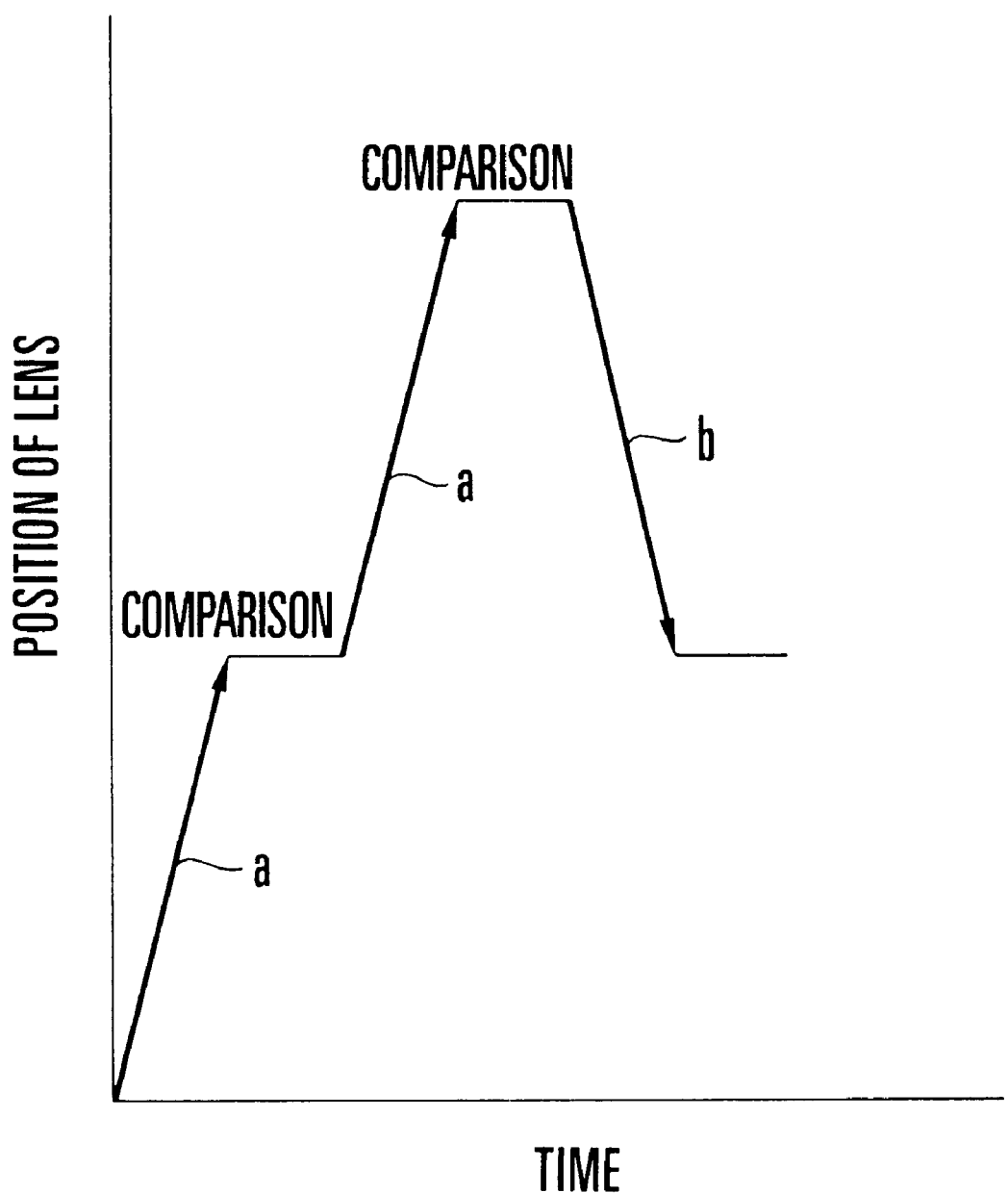
FIG. 6 is a graph showing a wobbling action.

The process of wobbling at the step S701 is now described as follows. Referring to FIG. 6 which shows the process of wobbling, the focusing lens 106 is moved by a predetermined amount of movement at a time. Every time the focusing lens 106 is moved by the predetermined amount of movement, an AF evaluation value obtained at the last position of the focusing lens 106 is compared with an AF evaluation value obtained at the current position of the focusing lens 106. If the current AF evaluation value is larger than the last AF evaluation value, the focusing lens 106 is caused to move further in the same direction "a". If the current AF evaluation value is smaller than the last AF evaluation value, the focusing lens 106 is caused to move in an inverse direction "b". The focusing lens 106 is thus moved always in the direction in which the AF evaluation value increases. In the process of wobbling, if the probability of moving the focusing lens 106 in one direction, i.e., either toward a nearest distance position or toward an infinity distance position, is high, the flow of operation shifts to the hill-climbing mode. In a case where the focusing lens 106 moves back and forth within a predetermined range, on the other hand, the focusing lens 106 is considered to be in an in-focus state, and the flow shifts to the restart deciding mode.

Figure 5:
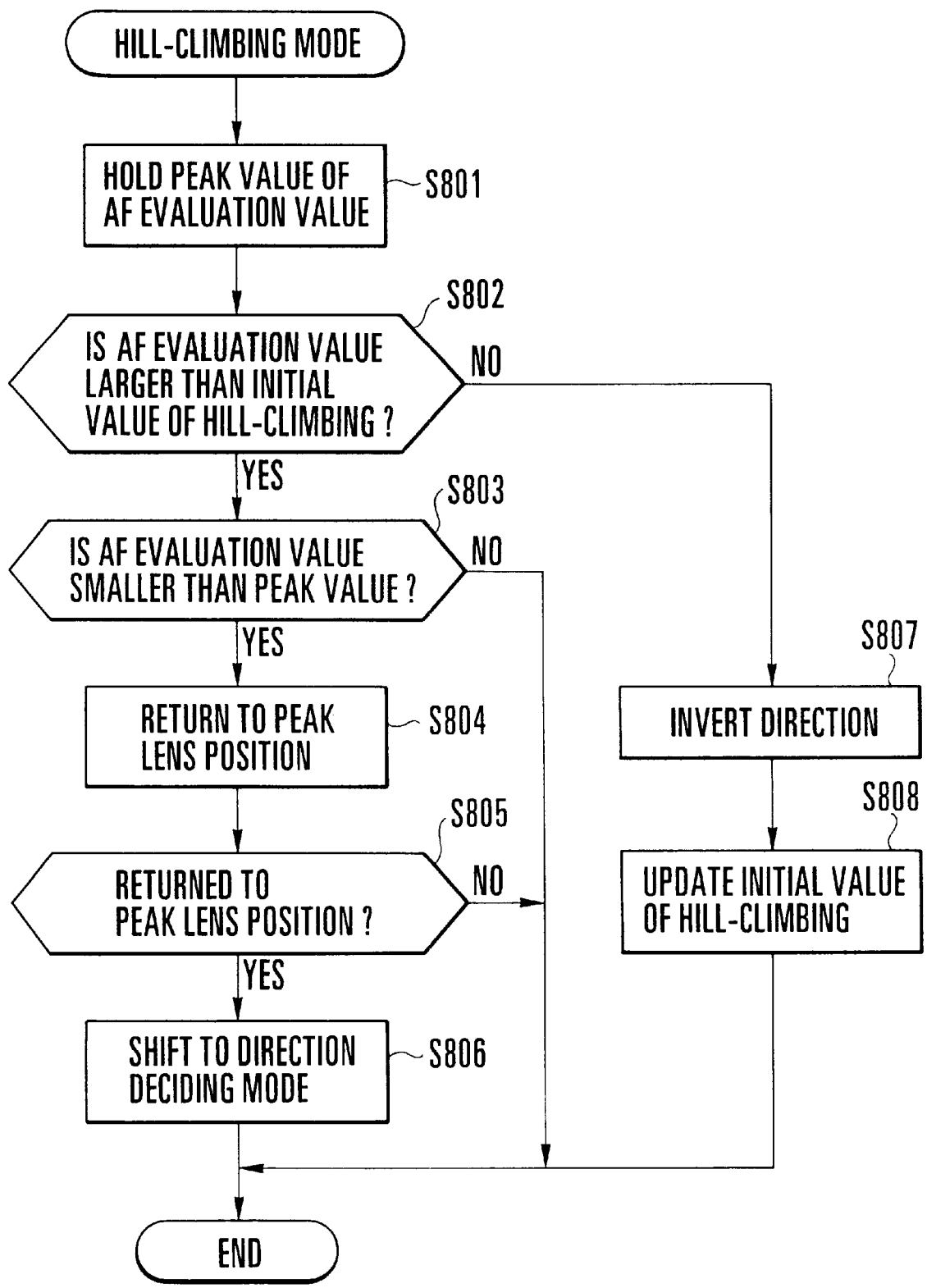
FIG. 5 is a flow chart showing an operation in a hill-climbing mode.

FIG. 5 shows the processes of the hill-climbing mode. At a step S801, a peak holding process is performed on the AF evaluation value. If the AF evaluation value is found to be larger than a current peak value, the AF evaluation value is newly set as a peak value of AF evaluation, and the position of the focusing lens 106 where the peak value has been obtained is stored. At the next step S802, a check is made to find if the AF evaluation value has become larger than the initial value of hill climbing held by the step S707. If so, the flow of operation comes to a step S803. At the step S803, a check is made to find if the AF evaluation value is smaller than the peak value. If not, the flow comes to an end.

If the AF evaluation value is found to be smaller than the peak value at the step S803, the flow comes to a step S804 to execute a process of returning the focusing lens 106 to a position where the peak value has been obtained. At a step S805, a check is made to find if the focusing lens 106 has returned to the position where the peak value has been obtained. If so, the flow comes to a step S806 to shift to the direction deciding mode. If not, the flow comes to an end.

If the AF evaluation value is found to be smaller than the initial value of hill climbing at the step S802, the flow comes to a step S807 to invert the direction of the hill-climbing process. The focusing lens 106 is thus driven in an inverse direction. The flow of operation then comes to a step S808 to change the initial value of hill climbing to the current AF evaluation value.

The camera AF microcomputer 118 thus operates so as to bring the AF evaluation value always to a maximum value, by causing the focusing lens 106 to move while repeating the above-stated processes in a cycle of the restart deciding process→the direction deciding process→the hill-climbing process→the direction deciding process→the restart deciding process.

Figure 7:
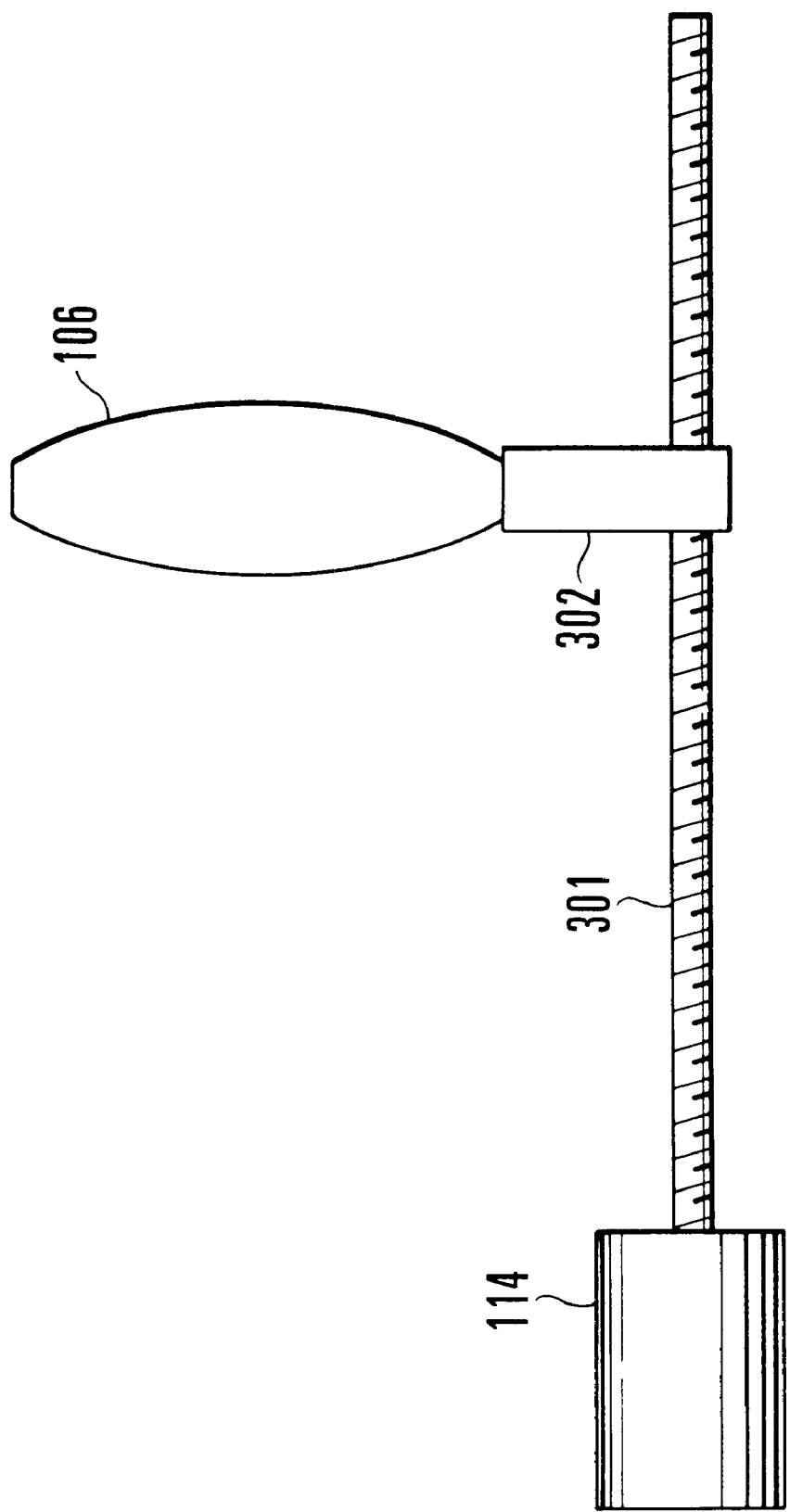
FIG. 7 is a side view showing a lens driving mechanism.
Figure 8:
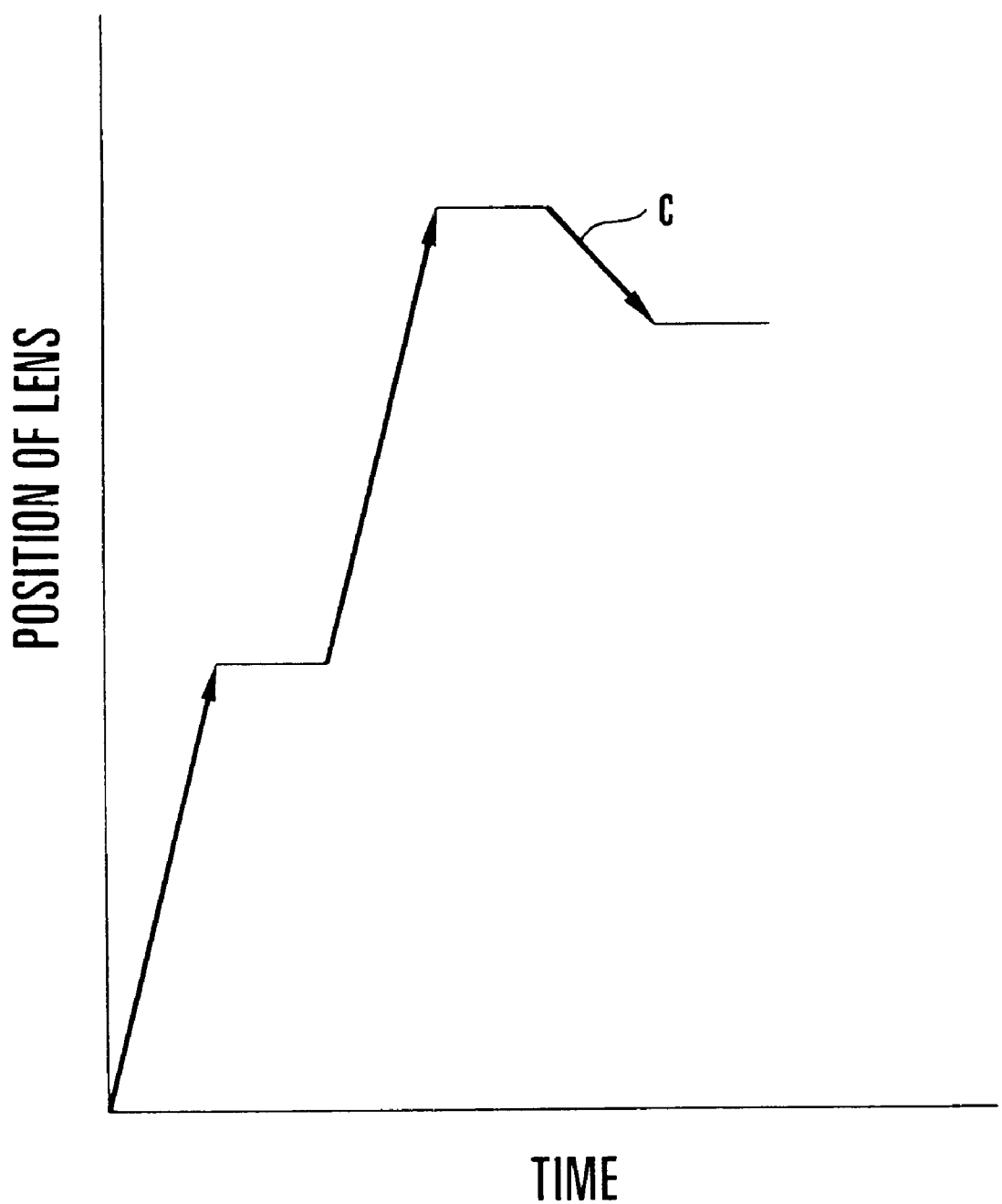
FIG. 8 is a graph showing the movement of a lens taking place when there is a play between a rotation shaft of a motor and a rack.
Figure 9:
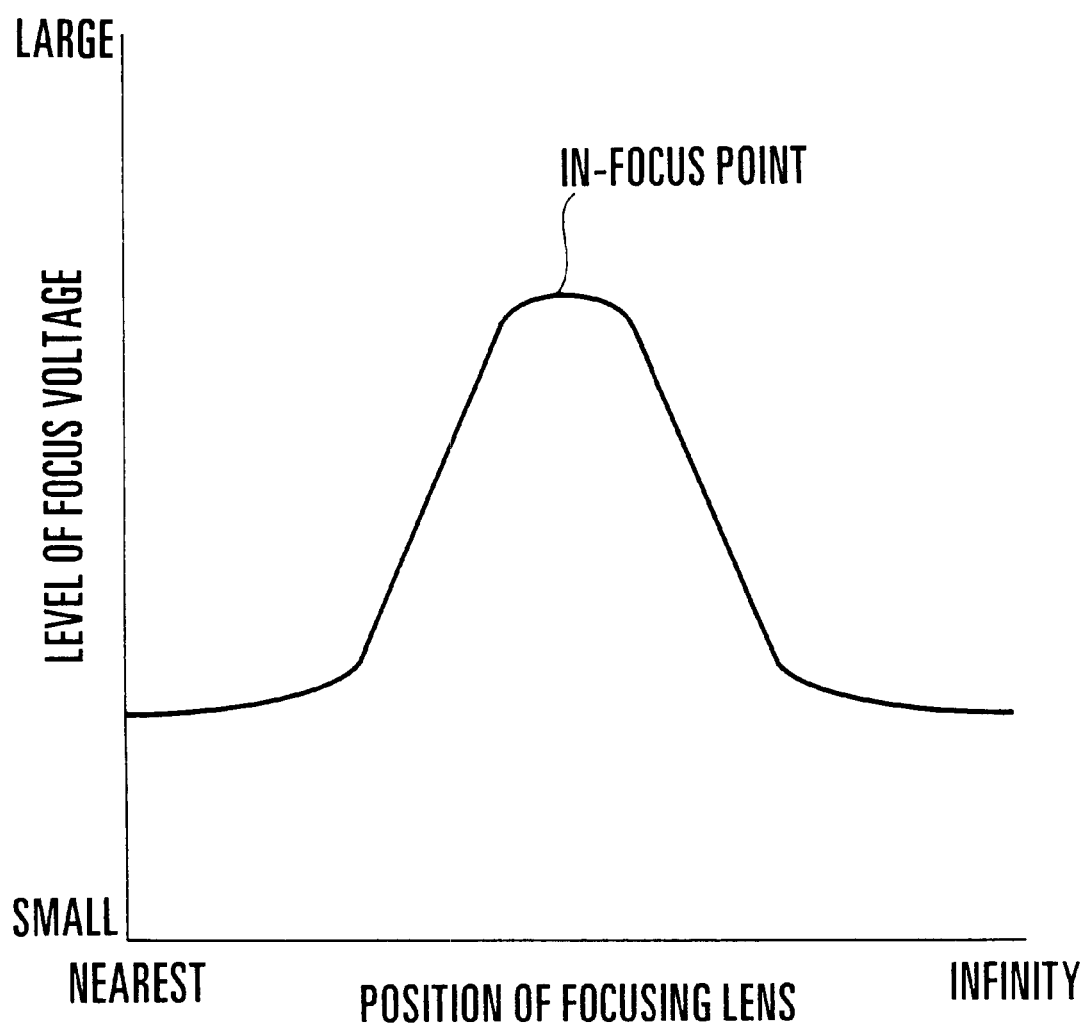
FIG. 9 is a graph showing the relationship between the position of a focusing lens and a focus voltage.

FIG. 7 shows a driving mechanism arranged to drive the focusing lens 106. The driving mechanism includes a focusing-compensating lens motor 114 which is arranged to drive the focusing lens 106. The motor 114 is provided with a rotation shaft 301. A rack 302 is arranged to be moved by the motor 114 through the rotation shaft 301. The focusing lens 106 is mounted on the rack 106.

A characteristic feature of this invention by which the problem of the prior art mentioned in the foregoing can be solved is next described as follows.

The camera AF microcomputer 118 executes control processes according to this invention as described below with reference to FIG. 11, which shows the details of the wobbling to be executed by the above-mentioned step S701 of FIG. 4.

Figure 11:
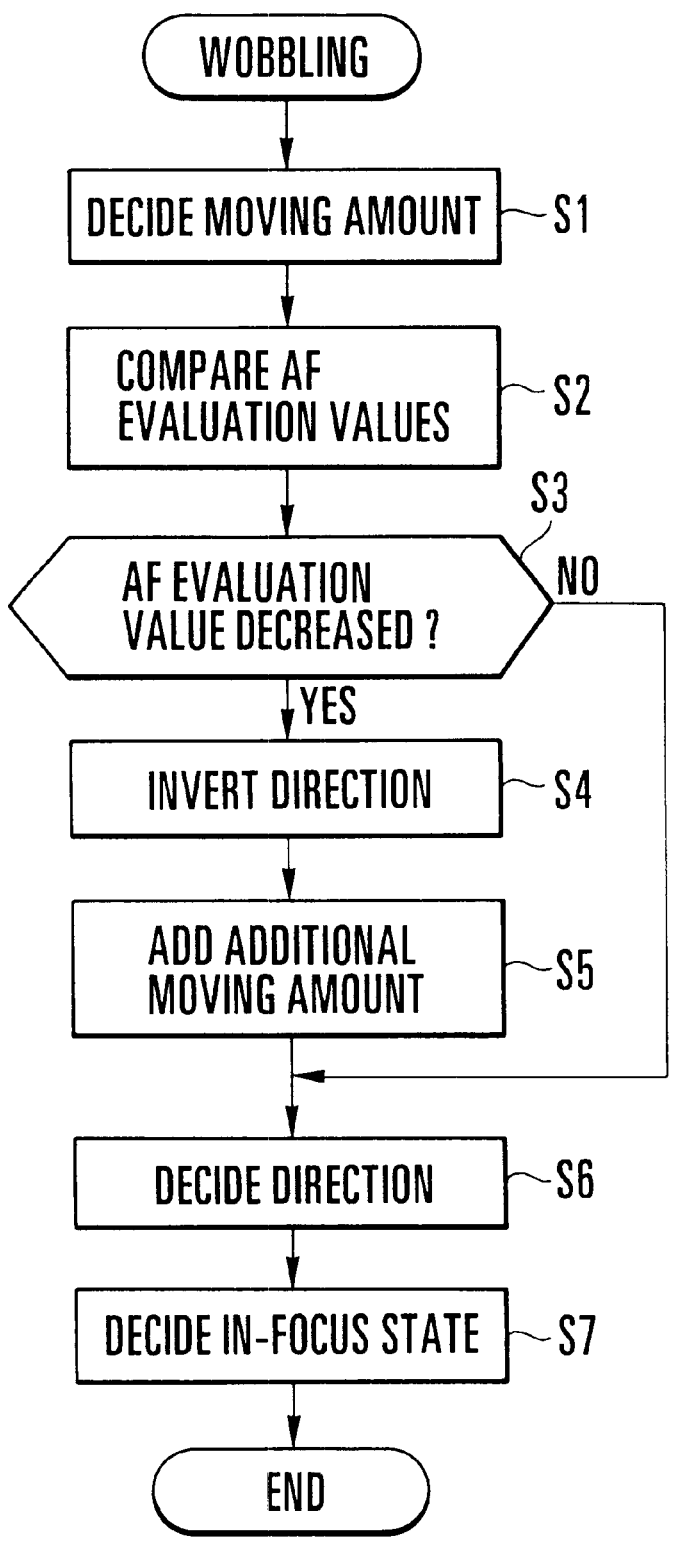
FIG. 11 is a flow chart showing an operation of the first embodiment of this invention.

Referring to FIG. 11, a predetermined amount of movement for wobbling is decided at a step S1. At a step S2, an AF evaluation value obtained at the current position of the focusing lens 106 is compared with an AF evaluation value obtained at the last position of the focusing lens 106. At a step S3, a check is made for a decrease in the AF evaluation value. If the AF evaluation value is found to have increased, the flow of operation jumps to a step S6. If the AF evaluation value is found to have decreased, the flow comes to a step S4. At the step S4, the direction of movement of the focusing lens 106 is inverted. At the next step S5, a predetermined additional amount of movement is added to the amount of movement decided by the step S1. At the step S6, the direction deciding process is performed. At a step S7, a check is made for an in-focus state, and then the flow comes to an end.

The above-stated step of adding the additional amount of movement when the direction of movement of the focusing lens is inverted effectively solves such a problem of the conventional device that the direction of movement is misjudged due to an insufficient change in AF evaluation value resulting from the failure to have a predetermined amount of movement at the time of inversion of the direction of movement as mentioned in the foregoing. Therefore, the focus adjustment can be accurately carried out.

Figure 12:
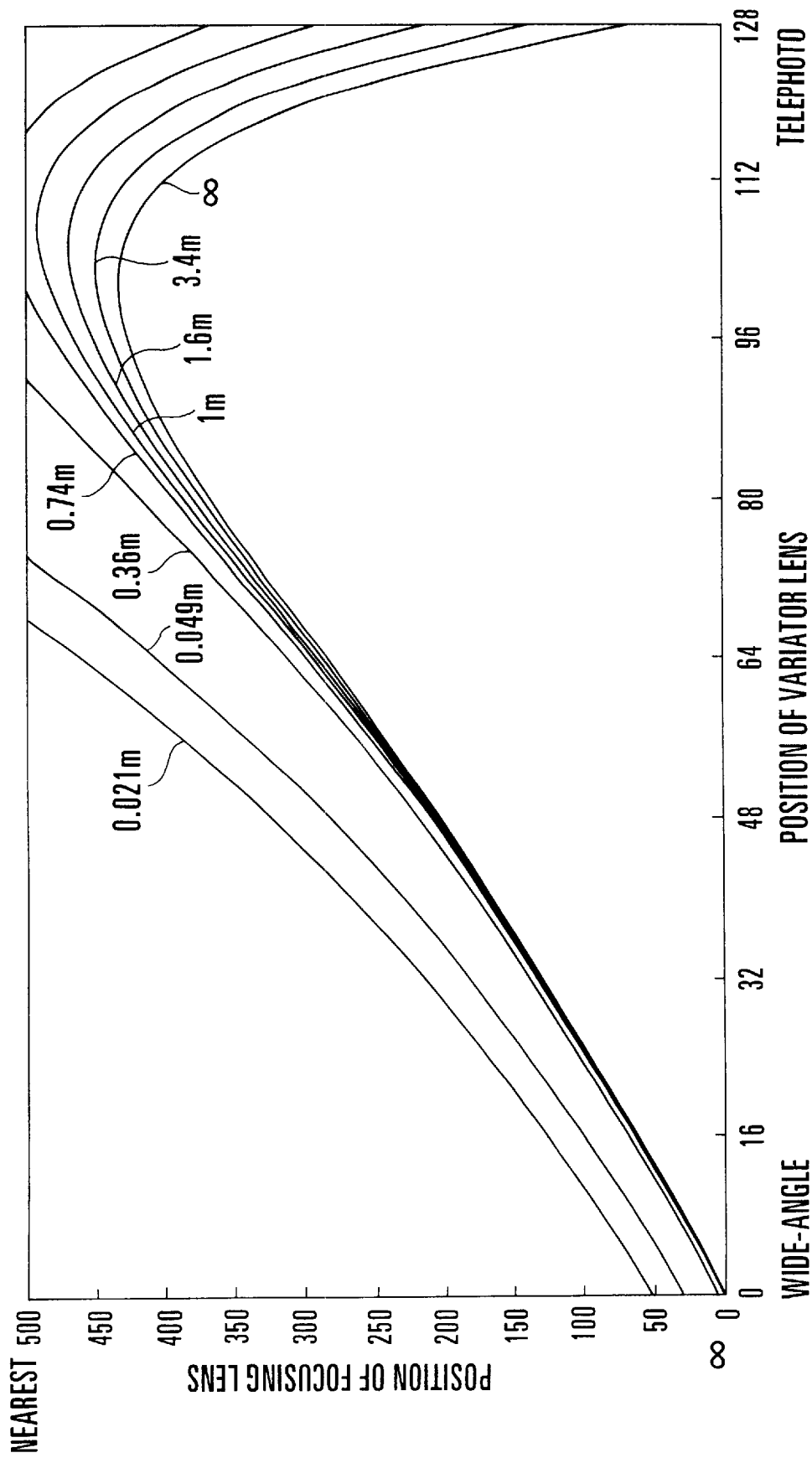
FIG. 12 is a graph showing the cam loci of a rear-focus type zoom lens used for the second embodiment of this invention.

A second embodiment of this invention is next described. FIG. 12 shows cam loci of a rear-focus type zoom lens. In FIG. 12, the position of a variator lens is indicated on the abscissa axis and the position of a focusing lens is indicated on the ordinate axis. As apparent from FIG. 12, an amount of movement of the focusing lens required with respect to a change of the object distance varies according to whether a zoom position is at a telephoto end or at a wide-angle end. On the basis of the conception shown in FIG. 12, the amount of movement of the focusing lens to be decided at the time of deciding the direction of movement is arranged these days to be larger at the telephoto end and smaller at the wide-angle end. Therefore, since the amount of movement on the telephoto side is arranged to be sufficiently larger than the amount of a play between the rack 302 and the rotation shaft 301, it is not necessary to add the additional amount of movement on the telephoto side.

Figure 13:
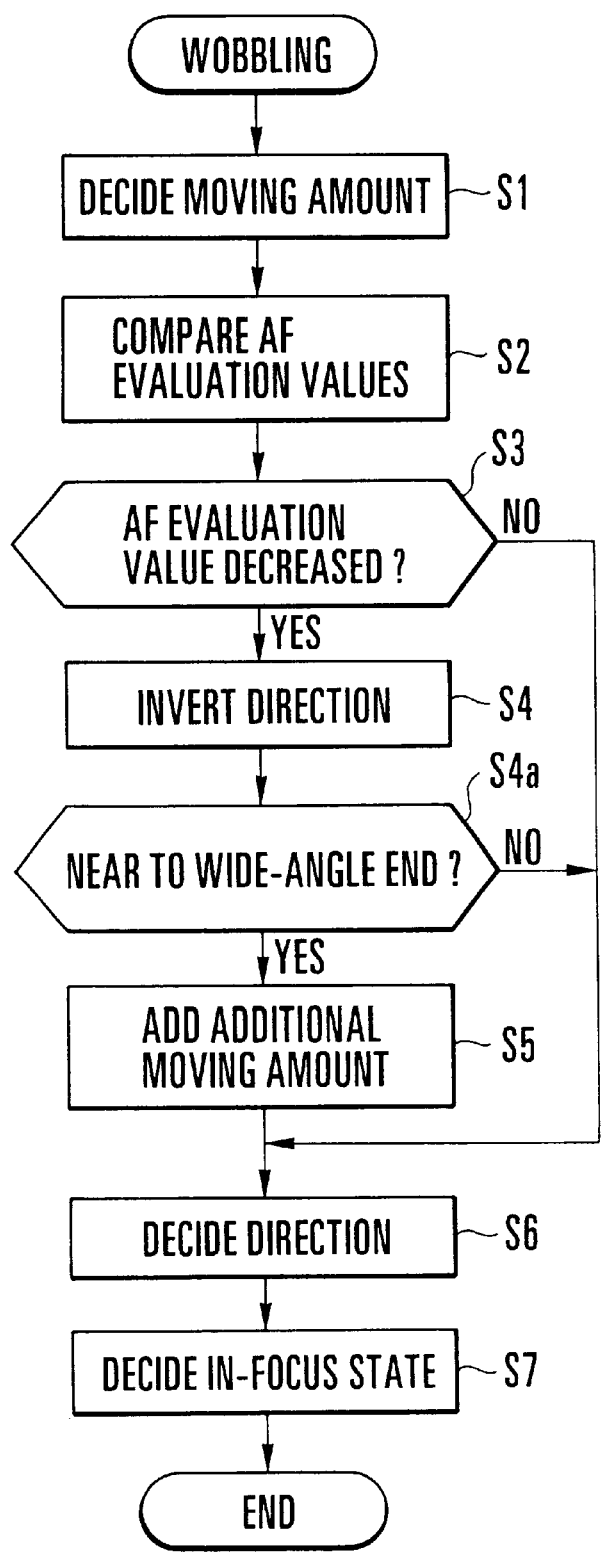
FIG. 13 is a flow chart showing an operation of the second embodiment of this invention.

FIG. 13 is a flow chart showing the control processes to be executed by the camera AF microcomputer 118 according to the second embodiment. FIG. 13 explains the details of the wobbling of the step S701 of FIG. 4. Steps S1 to S7 of FIG. 13 correspond to those of FIG. 11. In this case, however, there is added a step S4a between the steps S4 and S5. Referring to FIG. 13, if the AF evaluation value is found to have decreased at the step S3, the direction of movement of the focusing lens 106 is inverted at the step S4. Then, at the step S4a, a check is made to find if the position of the variator lens 103 is near to the wide-angle end. If not, the step S5 is inhibited and the flow jumps to the step S6. If so, the flow comes to the step S5 to add the additional amount of movement to the amount of movement decided by the step S1. After that, the direction deciding process is executed at the step S6, and a check is made for an in-focus state at the step S7 before the flow of operation comes to an end.

By adding the additional amount of movement when the direction of movement of the focusing lens is inverted as mentioned above, the focus adjustment can be accurately made in the same manner as in the case of the first embodiment. In addition to this, the step of inhibiting the addition of the additional amount of movement according to the focal length prevents the lens from being moved too much at a zoom position where it is not necessary to add the additional amount of movement. The focus adjustment thus can be more steadily carried out.

Figure 10:
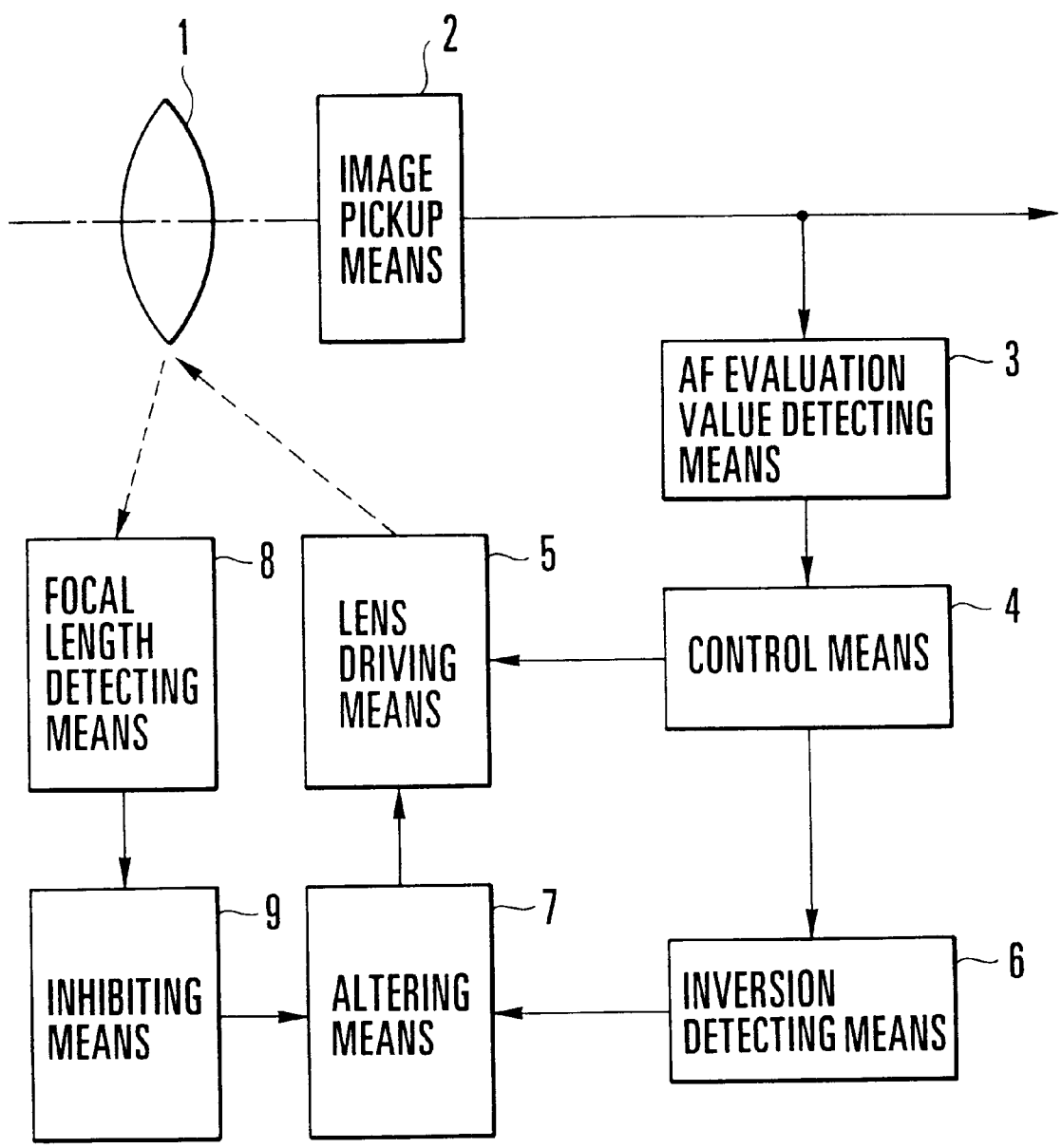
FIG. 10 is a block diagram conceptually showing first and second embodiments of this invention.

FIG. 10 is a block diagram conceptually showing the first and second embodiments described above. Referring to FIG. 10, the illustration includes a lens 1 which includes a focusing lens or a focusing lens and a variator lens, an image pickup means 2 which includes a CCD, an AF evaluation value detecting means 3 which is arranged to detect an AF evaluation value, a control means 4 which is arranged to perform control over automatic focusing, a lens driving means 5 which is arranged to cause the lens 1 to move back and forth along an optical axis, an inversion detecting means 6 which is arranged to detect inversion of the direction of movement of the lens 1 from one direction to the other, an altering means 7 which is arranged to alter the amount of movement of the lens 1 in response to detection of the inversion by the inversion detecting means 6, a focal length detecting means 8 which is arranged to detect the focal length of the lens 1, and an inhibiting means 9 which is arranged to inhibit the amount of movement of the lens 1 from being altered, according to the focal length detected by the focal length detecting means 8.

The above-described arrangement shown in FIG. 10 operates as follows. An image of an object of shooting is picked up by the image pickup means 2 through the lens 1. The level of a high-frequency component of an image signal thus obtained is extracted by the AF evaluation value detecting means 3. Information on the level of the high-frequency component is supplied as an AF evaluation value to the control means 4. The control means 4 then controls and causes the lens driving means 5 to move the lens 1 back and forth by a predetermined moving amount at a time in such a way as to bring the AF evaluation value to a maximum value. The lens 1 is thus controlled and moved in the so-called hill-climbing manner toward an in-focus point. During this control, when inversion of the direction of movement of the lens 1 is detected by the inversion detecting means 6, the altering means 7 alters the amount of movement by adding an additional amount of movement to the above-stated predetermined amount of movement decided by the lens driving means 5.

The focal length detecting means 8 finds if the focal length position of the lens 1 is near to the wide-angle end. If not, the inhibiting means 9 inhibits the altering means 7 from altering the amount of movement.

According to the arrangement of the embodiments described above, the amount of movement of the lens is altered when the direction of movement of the lens is inverted, in such a way as to secure an adequate amount of movement of the lens at the time of inversion of the direction of movement of the lens, so that a change of the AF evaluation value can be accurately detected to ensure precise focus adjustment.

Further, the arrangement of inhibiting alteration of the amount of movement according to the focal length effectively prevents the lens from being moved too much within a certain range of zoom positions, so that focus adjustment can be steadily carried out without fluctuations.

Furthermore, the arrangement of inhibiting alteration of the amount of movement when the focal length is not near to the wide-angle end effectively eliminates the possibility of moving the lens too much by increasing the amount of movement of the lens on the side of the telephoto end.

Figure 14:
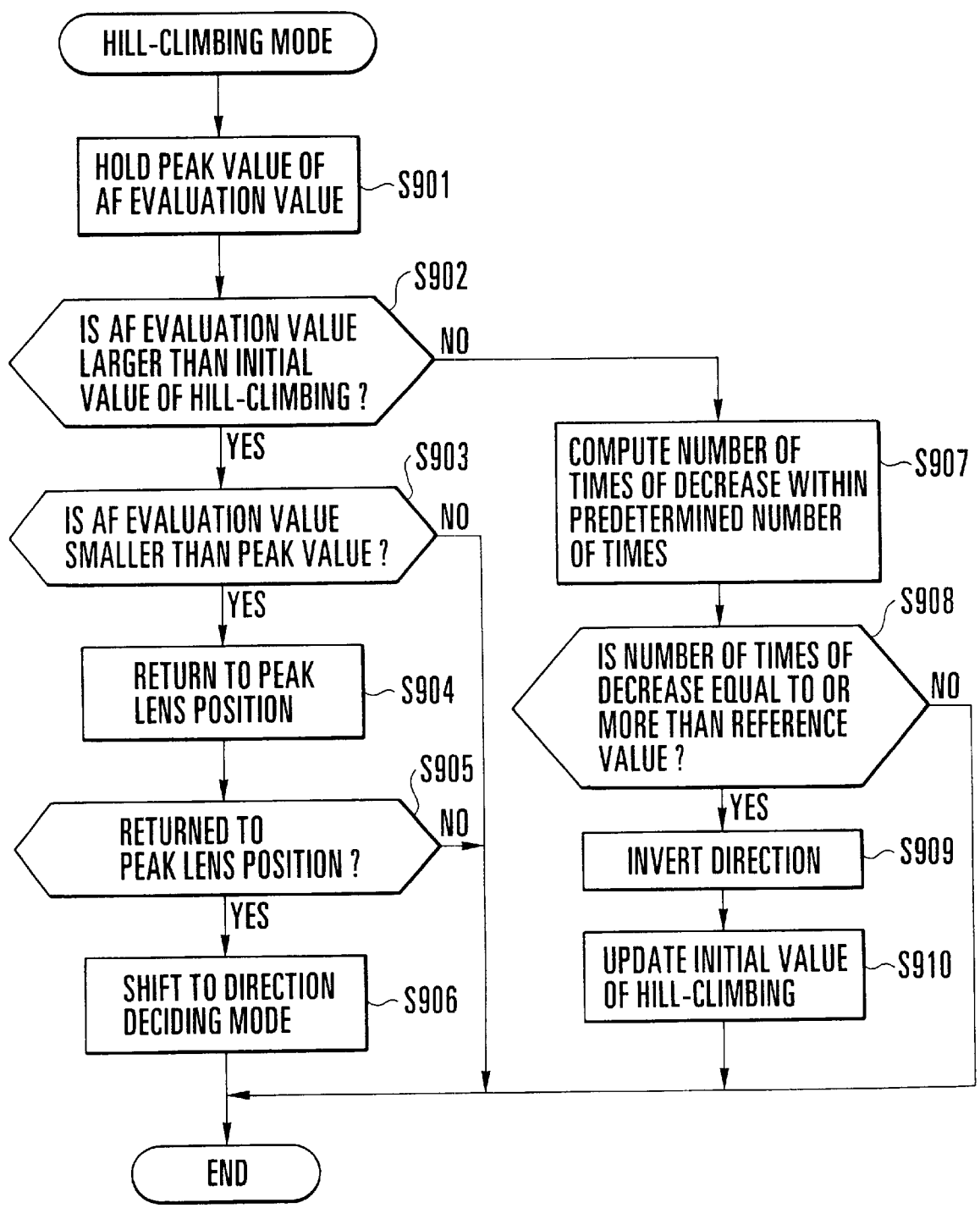
FIG. 14 is a flow chart showing a hill-climbing mode process.

Third and fourth embodiments of this invention are next described. Matters prerequisite to the third and fourth embodiments are first described as follows. The structural arrangement of each of the third and fourth embodiments is similar to FIG. 1. The AF process, the restart deciding process and the direction deciding process of the third and fourth embodiments are the same as those shown in FIGS. 2, 3 and 4. FIG. 14 is a flow chart showing a flow of operation in a hill-climbing mode, which differs in part from the hill-climbing mode shown in FIG. 5.

Referring to FIG. 14, at a step S901, a peak holding process is executed for the AF evaluation value. If the AF evaluation value is found to be larger than the current peak value, the AF evaluation value is newly set as a peak value, and the position of the focusing lens where the AF evaluation value is obtained is stored. At the next step S902, a check is made to find if the AF evaluation value has become larger than the initial value of hill climbing held by the step S707 of FIG. 4. If so, the flow of operation comes to a step S903. At the step S903, a check is made to find if the AF evaluation value is smaller than the peak value. If not, the flow comes to an end.

If the AF evaluation value is found to be smaller than the peak value at the step S903, the flow comes to a step S904 to execute a process of returning the focusing lens to a position where the peak value has been obtained. At a step S905, a check is made to find if the focusing lens has returned to the position where the peak value has been obtained. If so, the flow comes to a step S906 to shift to the direction deciding mode. If not, the flow comes to an end.

If the AF evaluation value is found to have been decreased from the initial value of hill climbing at the step S902, the flow comes to a step S907 to compute a number of times of decrease having occurred within a predetermined number of times of moving the focusing lens in the past. At a step S908, a check is made to find if the number of times of decrease is equal to or more than a reference value. If so, the flow comes to a step S909 to invert the hill-climbing direction and to drive the focusing lens in the reverse direction. At a step S910, the initial value of hill climbing is updated by changing it to the current AF evaluation value. If the number of times of decrease is found to be less than the reference value at the step S908, the flow of operation is brought to an end.

The camera AF microcomputer 118 thus operates to bring the AF evaluation value always to a maximum value by causing the focusing lens to move by repeating the above-stated processes in a cycle of the restart deciding process→the direction deciding process→the hill climbing process→the direction deciding process→the restart deciding process.

However, the above-described arrangement shown in FIG. 14 has presented the following problem.

In the hill-climbing mode of FIG. 14, at the time of the inversion of the hill-climbing direction by the step S909, the inverting process is executed in the same manner for any of shooting objects irrespective of their states. However, in a case where the object is of a high luminance or under a low illuminance, an image signal obtained from the object includes a large amount of noise component, which tends to cause an erroneous decision for the inversion of the direction. As a result, the inverting process has been often sensitively repeated in response to the noise component.

The third and fourth embodiments are developed to solve the above-stated problem and are arranged to give an automatic focus adjusting device which is capable of eliminating any erroneous decision of the inversion resulting from a noise.

An automatic focus adjusting device arranged as the third embodiment of this invention is provided with focus evaluation value detecting means for detecting a focus evaluation value indicative of a focusing state of a lens on the basis of an image signal outputted from image pickup means, focus control means for performing a focus adjusting operation by moving the lens in an optical axis direction in such a way as to cause the focus evaluation value detected by the focus evaluation value detecting means to become a maximum value, luminance detecting means for detecting a luminance of an object, and control means for providing a control to lower a response characteristic of the focus adjusting operation of the focus control means according to the luminance detected by the luminance detecting means.

Further, an automatic focus adjusting device arranged as the fourth embodiment of this invention is provided with focus evaluation value detecting means for detecting a focus evaluation value indicative of a focusing state of a lens on the basis of an image signal outputted from image pickup means, focus control means for performing a focus adjusting operation by moving the lens in an optical axis direction in such a way as to cause the focus evaluation value detected by the focus evaluation value detecting means to become a maximum value, illuminance detecting means for detecting an illuminance to an object, and control means for providing a control to lower a response characteristic of the focus adjusting operation of the focus control means according to the illuminance detected by the illuminance detecting means.

The details of the third embodiment of this invention are as follows. In the case of the third embodiment, this invention is applied to a video camera which is arranged in the same manner as the arrangement shown in the block diagram of FIG. 1.

Figure 16:
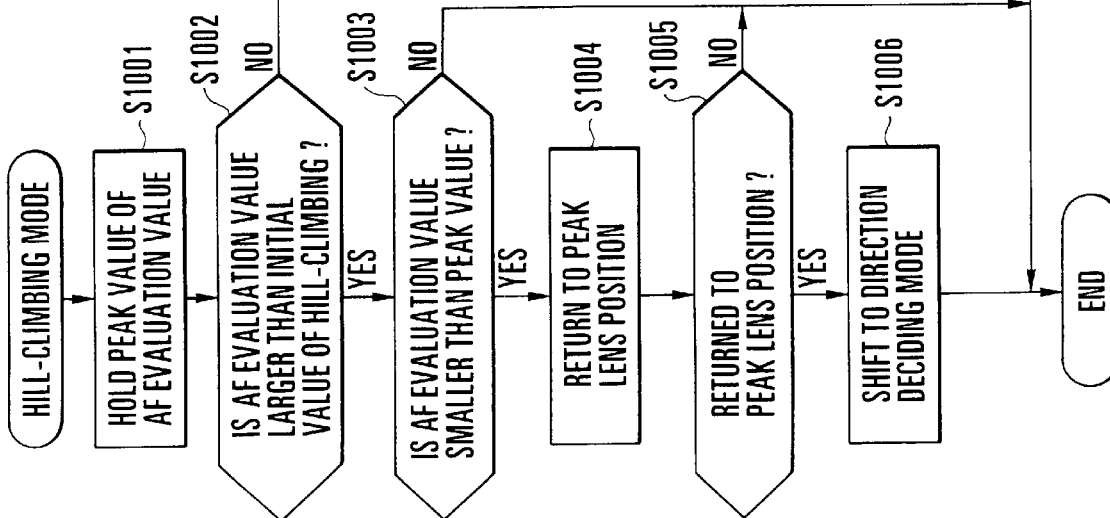
FIG. 16 is a flow chart showing an operation of the third embodiment of this invention.

In the third embodiment, the camera AF microcomputer 118 performs control as described below with reference to FIG. 16, which is a flow chart of a hill-climbing process corresponding to the hill-climbing mode shown in FIG. 14.

At a step S1001, the process begins, and the peak value of the AF evaluation value is held. At a step S1002, a check is made to find if the AF (or focus) evaluation value is larger than the initial value of hill-climbing. If the AF evaluation value is found to have decreased from the initial value of hill-climbing, the flow of operation comes to a step S1007 to make a check to find if the object is of a high luminance. Whether the luminance of the object is high or not is decided on the basis of the peak level of an image signal inputted to the AF (focus) evaluation value processing circuit 117. If the luminance is not high, the flow comes to a step S1008 to compute a number of times of decrease having occurred within a predetermined number of times A1 of moving the focusing lens in the past. At a step S1009, a check is made to find if the number of times of decrease is equal to or more than a reference value A2. If so, the flow comes to a step S1012 to invert the direction of the hill-climbing (control) process and to have the focusing lens 106 driven in the opposite direction. Then, at a step S1013, the initial value of hill climbing is updated to the current AF evaluation value. If the number of times of decrease is found to be less than the reference value A2 at the step S1009, the flow comes to an end.

An essential feature of the third embodiment begins at a step S1010. If the luminance is found to be high at the step S1007, the flow comes to the step S1010. At the step S1010, a number of times of decrease within a predetermined number of times B1 in the past is computed. At a step S1011, a check is made to find if the number of times of decrease is equal to or more than a reference value B2. If so, the flow comes to the step S1012 to invert the direction of the hill-climbing process and to have the focusing lens 106 driven in the opposite direction. At the step S1013, the initial value of hill climbing is updated to the current AF evaluation value. If the number of times of decrease is found to be less than the reference value B2 at the step S1011, the flow comes to an end.

The predetermined numbers of times A1 and B1 and the reference values A2 and B2 mentioned above are arranged, for example, to be as shown below.

The predetermined number of times A1: three times
The reference value A2: two times
The predetermined number of times B1: five times
The reference value B2: three times With the third embodiment arranged in this manner, the direction of movement of the focusing lens is normally inverted when the AF evaluation value is found to have decreased twice in moving the focusing lens three times. In a case where the luminance of the object is high, on the other hand, the direction of movement of the focusing lens is not inverted unless the AF evaluation value decreases three times from the initial value of the hill-climbing process in moving the focusing lens five times. In other words, the timing of the inversion in this case is retarded to lower the response characteristic of the focus adjusting operation and to make the speed of the focus adjusting operation slower. This arrangement prevents hunting or the like from being caused by such repetitious inversion that too sensitively takes place in response to signal changes in carrying out the hill-climbing control over automatic focusing, so that the focus can be accurately adjusted.

Figure 17:
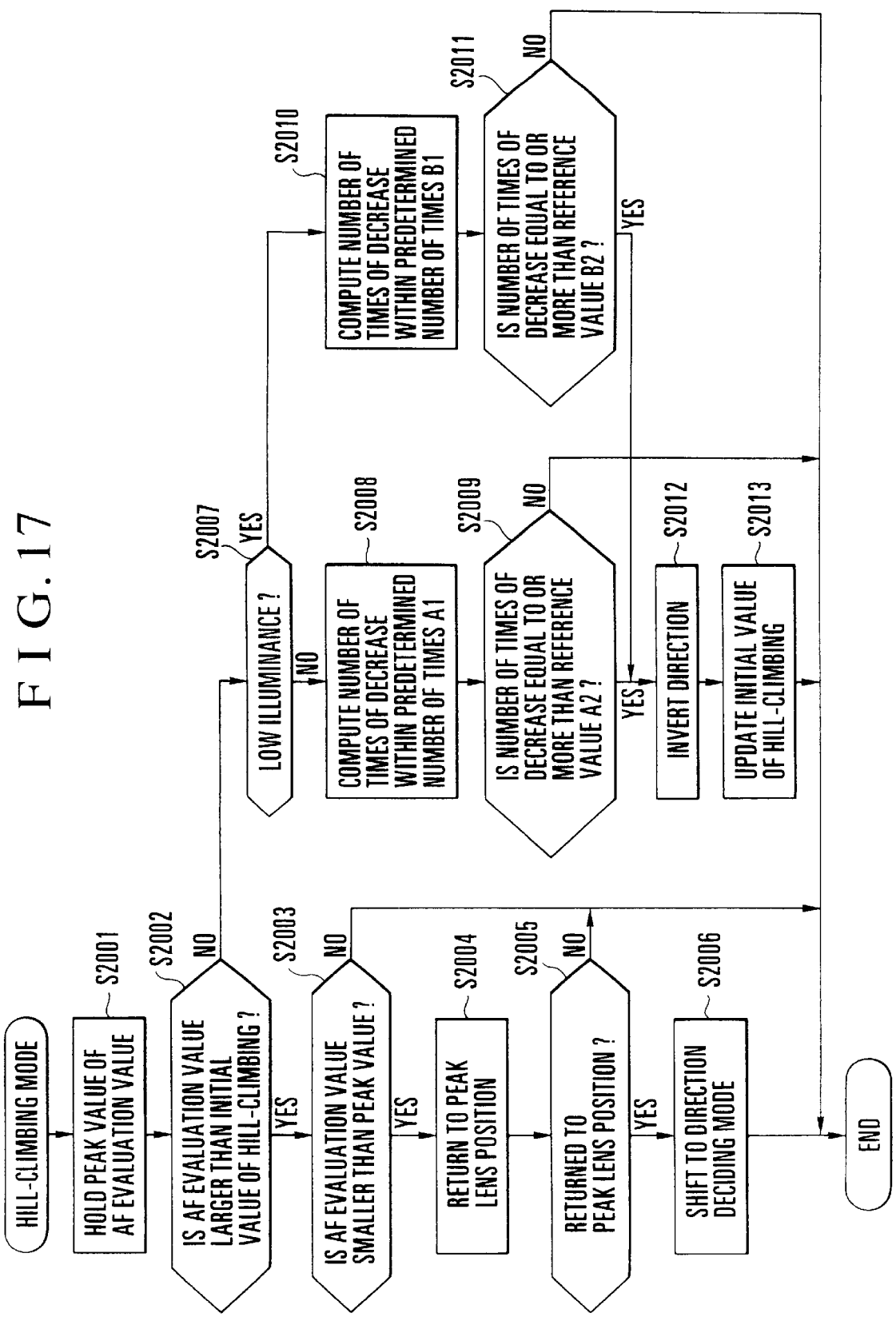
FIG. 17 is a flow chart showing an operation of the fourth embodiment of this invention.

The fourth embodiment of this invention is next described as follows. FIG. 17 is a flow chart showing a flow of a control operation of the camera AF microcomputer 118 and corresponds to the process of the hill climbing mode shown in FIG. 14. Referring to FIG. 17, the process of the hill-climbing mode begins at a step S2001. At a step S2002, a check is made to find if the AF evaluation value is larger than the initial value of hill-climbing. If the AF evaluation value is found to have decreased from the initial value of hill-climbing, the flow of operation comes to a step S2007 to make a check to find if the object is under a low illuminance. Whether the illuminance is low or not is decided on the basis of the amplifying rate of the AGC circuit 108 which is controlled by the camera AF microcomputer 118. If the illuminance is not low, the flow comes to a step S2008 to compute a number of times of decrease having occurred within a predetermined number of times A1 in the past. At a step S2009, a check is made to find if the number of times of decrease is equal to or more than a reference value A2. If so, the flow comes to a step S2012 to invert the direction of the hill-climbing process and to have the focusing lens 106 driven in the opposite direction. Then, at a step S2013, the initial value of hill-climbing is updated to the current AF evaluation value. In a case where the number of times of decrease is found to be less than the reference value A2 at the step S2009, the flow comes to an end.

An essential feature of the fourth embodiment begins at a step S2010. If the illuminance is found to be low at the step S2007, the flow comes to the step S2010. At the step S2010, a number of times of decrease having occurred within a predetermined number of times B1 in the past is computed. At a step S2011, a check is made to find if the number of times of decrease is equal to or more than a reference value B2. If so, the flow comes to the step S2012 to invert the direction of the hill-climbing process and to have the focusing lens 106 driven in the opposite direction. At the step S2013, the initial value of hill climbing is updated to the current AF evaluation value. If the number of times of decrease is found to be less than the reference value B2 at the step S2011, the flow comes to an end.

The predetermined numbers of times A1 and B1 and the reference values A2 and B2 mentioned above are arranged, for example, to be as shown below.

The predetermined number of times A1: three times
The reference value A2: two times
The predetermined number of times B1: five times
The reference value B2: three times With the fourth embodiment arranged in this manner, the direction of movement of the focusing lens is normally inverted when the AF evaluation value is found to have decreased twice in moving the focusing lens three times. In a case where the illuminance is low, on the other hand, the direction of movement of the focusing lens is not inverted unless the AF evaluation value decreases three times from the initial value of hill-climbing in moving the focusing lens five times. In other words, the timing of inversion is retarded to lower the response characteristic of the focus adjusting operation and to make the speed of the focus adjusting operation slower. This arrangement prevents such repetitious inversion that too sensitively takes place in response to signal changes in carrying out the hill-climbing control over automatic focusing, so that the focus can be accurately adjusted.

Figure 15:
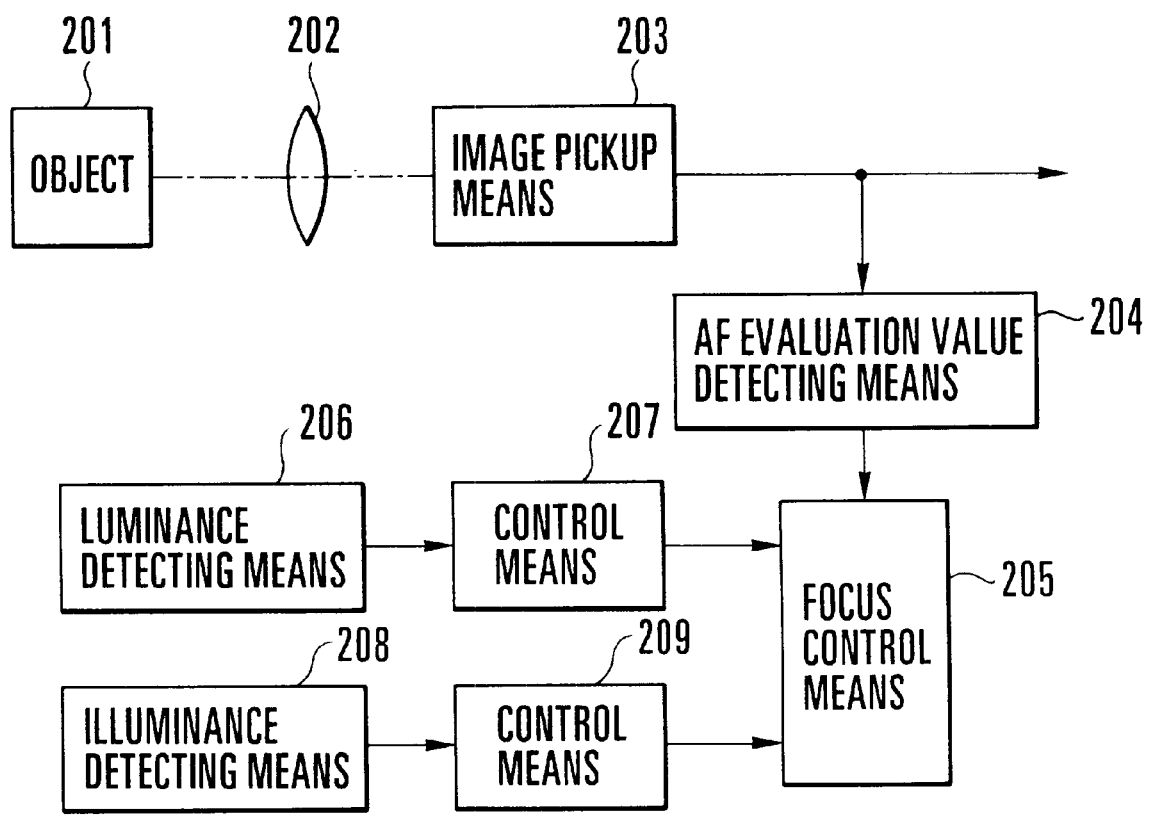
FIG. 15 is a block diagram conceptually showing third and fourth embodiments of this invention.

FIG. 15 is a block diagram conceptually showing the third and fourth embodiments of this invention. Referring to FIG. 15, the illustration includes an object of shooting 201, a lens 202 which including a focusing lens, an image pickup means 203 which is composed of a CCD, etc., a focus (AF) evaluation value detecting means 204 which is arranged to detect a focus (AF) evaluation value of a focus voltage or the like on the basis of an image signal obtained from the image pickup means 203, a focus control means 205 which is arranged to move the lens 202 in an optical direction on the basis of the focus (AF) evaluation value detected, a luminance detecting means 206 which is arranged to detect the luminance of the object 201, a control means 207 which is arranged to control the focus control means 205 according to the result of detection made by the luminance detecting means 206, an illuminance detecting means 208 which is arranged to detect the illuminance to the object 201, and a control means 209 which is arranged to control the focus control means 205 according to the result of detection made by the illuminance detecting means 208.

The operation of the above-stated arrangement shown in FIG. 15 is as follows. The focus (AF) evaluation value detecting means 204 detects a focus (AF) evaluation value from the image signal coming from the image pickup means 203. The focus control means 205 then causes the lens 202 to be moved back and forth in such a way as to bring the focus (AF) evaluation value to its maximum value. When a high luminance is detected by the luminance detecting means 206, the control means 207 controls and causes the focus control means 205 to moderately and slowly perform its focus adjusting operation. When a low illuminance is detected by the illuminance detecting means 208, the control means 209 controls and causes the focus control means 205 to moderately and slowly perform the focus adjusting operation by lowering its response characteristic. To be more specific, the operation is moderated by reducing the number of times of inverting the direction of movement of the lens 202.

As described above, according to the arrangement of the third and fourth embodiments, the motion of the lens can be prevented from repetitiously inverting its direction by sensitively responding to signal changes caused by a noise component of the image signal. The focus adjustment, therefore, can be reliably carried out.

What is claimed is:

1. An automatic focus adjusting device comprising:

focus evaluation value detecting means for detecting a focus evaluation value indicative of a focusing state of a lens on the basis of an image signal outputted from image pickup means;

focus control means for performing a focus adjusting operation by causing said lens to move in an optical axis direction in such a way as to cause the focus evaluation value detected by said focus evaluation value detecting means to become a maximum value;

luminance detecting means for detecting a luminance of an object; and control means for providing a control to lower a response characteristic of the focus adjusting operation of said focus control means for turn a driving direction of said focus lens in the case that a high luminance is detected by said luminance detecting means.

2. A device according to claim 1, wherein said luminance detecting means is arranged to detect a level of the image signal.

3. A device according to claim 1 or 2, wherein said focus control means is arranged to perform the focus adjusting operation under the control of said control means in such a way as to reduce a number of times of inverting a direction of movement of said lens.

4. An automatic focus adjusting device comprising:

focus evaluation value detecting means for detecting a focus evaluation value indicative of a focusing state of a lens on the basis of an image signal outputted from image pickup means;

focus control means for performing a focus adjusting operation by causing said lens to move in an optical axis direction in such a way as to cause the focus evaluation value detected by said focus evaluation value detecting means to become a maximum value;

illuminance detecting means for detecting an illuminance to an object; and control means for providing a control to lower a response characteristic of the focus adjusting operation of said focus control means for turn a driving direction of said focus lens in the case that a low illuminance is detected by said illuminance detecting means.

5. A device according to claim 4, further comprising an AGC circuit which controls a gain of the image signal, wherein said illuminance detecting means is arranged to detect an amplifying rate of said AGC circuit.

* * * * *

UNITED STATES PATENT AND TRADEMARK OFFICE
CERTIFICATE OF CORRECTION

PATENT NO. : 6,590,613 B2
DATED : July 8, 2003
INVENTOR(S) : Hitoshi Yasuda

It is certified that error appears in the above-identified patent and that said Letters Patent is hereby corrected as shown below:

Column 1,
Line 9, delete "300" and insert -- 340 --.

Signed and Sealed this

Sixth Day of January, 2004

JAMES E. ROGAN
*Director of the United States Patent and Trademark Office*